Dec. 6, 1955  W. BAIER ET AL  2,726,042
HEATING PLANT, PARTICULARLY FOR MOTOR VEHICLES
Filed Nov. 21, 1952

Inventor:
WALTER BAIER &
ROBERT VON LINDE
BY
ATTORNEY

United States Patent Office 2,726,042
Patented Dec. 6, 1955

2,726,042

HEATING PLANT, PARTICULARLY FOR MOTOR VEHICLES

Walter Baier, Stockdorf, near Munich, and Robert von Linde, Planegg, near Munich, Germany, assignors to Wilhelm Baier K. G., Stockdorf, near Munich, Germany Application November 21, 1952, Serial No. 321,906

Claims priority, application Germany November 21, 1951

7 Claims. (Cl. 237—12.3)

The invention relates to a heating plant, particularly for motor vehicles with a heating appliance serving to supply heat to the liquid coolant of an internal combustion engine and provided with a source of heat, and a radiator to cool the engine. The invention has the object of arranging the heating appliance in such a manner and of connecting it to the coolant circuit in such a way that in cold weather it heats the internal combustion engine to a temperature favourable for quick starting by the use of heated cooling water or other liquid coolant, if desired. A further object of the invention is to heat also the passenger compartment and/or the driver's compartment, without affecting the continuous circulation of the coolant from the coolant chambers of the internal combustion engine and the radiator, which circulation is required for the dissipation of surplus heat when the internal combustion engine is running.

In a plant of this kind, which may also be used to operate a device for demisting the windscreen and other vehicle windows or similar heat consuming devices, it is of advantage to ensure that the coolant heated in the normal way by the operation of the internal combustion engine is supplied to the heating elements, and that the source of heat for the heating appliance is put out of action, or operated with a reduced heat output as long as a sufficient supply of heat is obtained from the waste heat of the engine.

This object is attained according to the invention in that the coolant pipe leading to the heating appliance is connected to the circulation pipe leading from the cooling chambers of the internal combustion engine to the radiator, and that the supply pipe for the coolant leaving the heating appliance is connected to the return pipe connecting the radiator with the internal combustion engine. With particular advantage the coolant pipe leading to the heating appliance is connected to that portion of the aforesaid circulation pipe which connects the engine coolant outlet socket to a control valve arranged ahead of the radiator in a manner known per se. This valve is preferably a thermostatically operated valve which allows the coolant to pass to the radiator only when the temperature of the coolant exceeds a certain value. A liquid circulating pump is preferably arranged in the pipe leading to the heating appliance.

Further features of the invention characterized in the claims will be apparent from the following description with reference to the embodiment illustrated by way of example in the drawing, in which:

Figure 1:
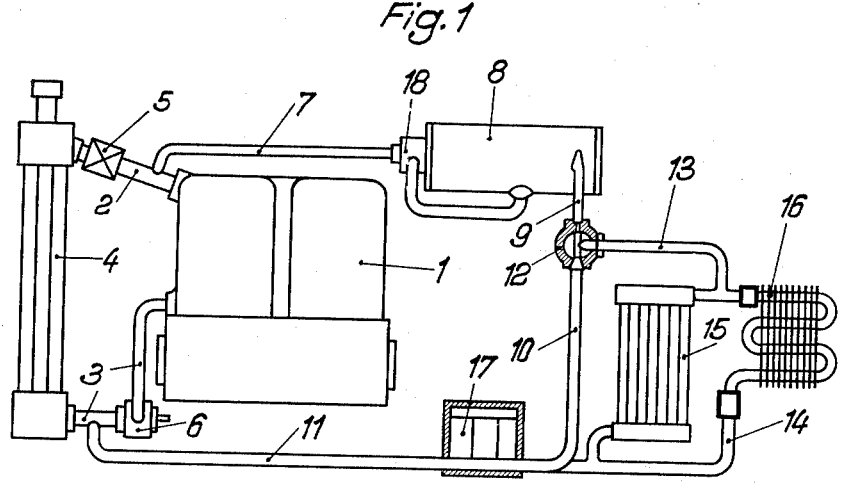
Figure 1 shows the scheme of a heating plant.

In the embodiment illustrated, the cooling chambers (not denoted in detail) of an internal combustion engine 1 built into a motor vehicle are connected to a radiator 4 by means of a circulation pipe 2 and a return pipe 3. In the pipe 2 there is provided a thermostatically operated valve 5 which in the usual manner allows the coolant to pass to the radiator 4 only when the temperature of the coolant exceeds a predetermed value. If necessary, instead of this automatically operating valve a valve may be used which may be operated at will. In the return pipe 3 a coolant circulation pump 6 is inserted which is coupled to the shaft of the internal combustion engine.

A coolant pipe 7 joins that part of the circulation pipe 2, which is disposed between the internal combustion engine and the valve 5 to the inlet socket of a circulation pump 18 which is structurally integrated with a heating appliance 8. The coolant which is heated in the appliance 8 by a source of heat, for example by a burner fed from the fuel storage of the vehicle, passes through the discharge pipe 9 and the supply pipes 10 and 11 into the return pipe 3 and through the pump 6 into the coolant chambers of the engine 1, to the walls of which it transfers a considerable proportion of the heat absorbed from the heating appliance. The internal combustion engine heated in this manner can now be started with a small consumption of work.

The discharge pipe 9 and the section 10 of the supply line are connected to a switch-over member 12 which has a third connection for a by-pass pipe 13. The heated coolant can be additionally supplied through this pipe to the heater elements 15 and 16 which are adapted for example for heating the passenger compartment and/or driver's cab, or for demisting the windscreen, or which may form part of a further device known per se for facilitating starting and ensuring safety of running. If necessary, more than two heater elements can be provided. In motor vehicles which are not intended for passenger transport one heater element may be sufficient. Even this may not be necessary, since the heating appliance alone may give out sufficient heat. The conduit 14 leading from the heater elements 15 and 16 and indicated diagrammatically in Figure 1 issues into the port 11 of the supply pipe.

In the position illustrated in Figure 1 of the switch-over member 12, part of the heated coolant is available without any substantial transference of heat to the engine 1, and the heat in another portion of the coolant is available for other requirements. The switch-over member which is shown as a three-way cock can be so adjusted that the whole of the coolant flowing through the discharge pipe 9 may pass directly to the engine, or (by the selection of the third switching position possible) to the engine via the heater elements 15 and 16 respectively.

The invention not only ensures a sufficient heating of the engine and interior compartments of the vehicle when the vehicle is stationary, but also utilises the heat given out by the engine when running, so that, substantially, the heating appliance 8 only consumes fuel during the initial heating process and when insufficient heat is supplied by the engine itself. The heat generated by the heating appliance can be controlled automatically in a manner known per se, for example by a heat sensitive element influenced by the temperature of the liquid coolant or by the temperature inside the vehicle according to the amount of heat required, since the direction of flow in the heating circuit 7, 9, 10, 11 and 7, 9, 13, 14, 11 respectively coincides with the direction of flow of the coolant in the engine 1. In cold weather the starting of the engine is further facilitated particularly when an electric starting motor is used, by heating the battery as well as the cylinder walls and the lubricating oil. The working capacity of the battery can be considerably increased even by a moderate supply of heat. The battery 17 is accordingly with advantage brought into heat exchange relationship with one of the pipes containing warm coolant, that is for example according to Figure 1 with supply pipe 11 or with one of the pipes 10 or 14, or if desired arranged in a chamber heated by the particular pipe concerned. It may alternatively be located in the neighbourhood of the heating appliance 8.

Figure 2:
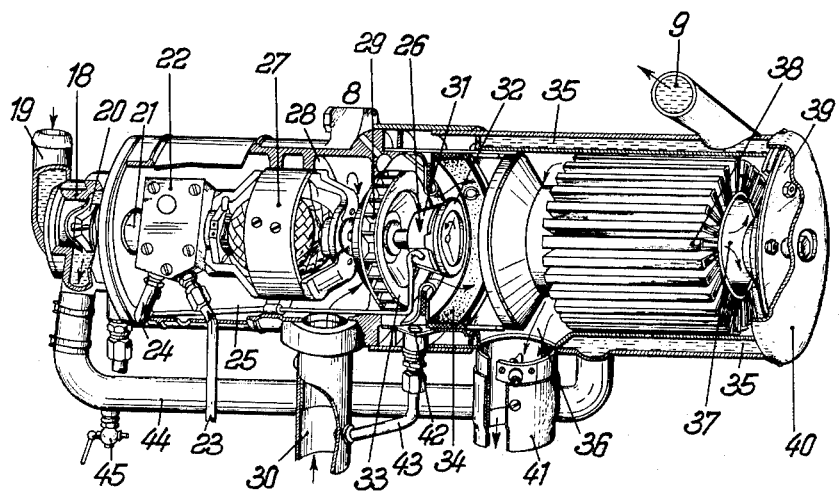
Figure 2 shows a longitudinal section through a perspective illustration of a heating appliance particularly suited for this plant.

A heating appliance which is particularly suitable for the plant according to the invention is shown in Figure 2. It consists of a bi-partite cylindrical casing 8 at one end of which is disposed the circulation pump 18 and the coolant supply socket 19. The pump 18 has an impeller rotor 20 mounted on the shaft 21. The shaft 21 also carries the fuel feeder pump 22 which supplies the fuel to the heating appliance 8. The fuel supply to the fuel feeder pump 22 is introduced through the supply pipe 23 and thence pumped through the tubular socket 24 and the supply pipe 25 to an atomiser 26. The driving motor 27 of the heating appliance is connected to the pump 22. Preferably this driving motor is an electric motor supplied by the battery of the vehicle, and is suspended within the casing 8 on the annular flanges 28. The electric motor also drives the blower 29 for the combustion air, which flows into the appliance through the socket 30. Adjacent the blower 29 an atomiser 26 is mounted on the shaft 21 which is composed of a conical ring 31 and a closure plate 32. The injection end 33 of the fuel supply pipe 25 leads into this conical ring 31. The wall of the forward cylindrical portion of the heating device 8 is safeguarded in the immediate neighbourhood of the atomiser 26 by a heat-resistant lining 34. The forward portion of the cylindrical heating appliance 8 is surrounded by a jacket 35 for receiving the coolant to be heated in the heating appliance. Within this heating jacket there is located the main combustion chamber which is closed by the funnel-shaped wall 36, and which, through a central aperture in the said wall 36 is in communication with the heat exchanger chamber 37. Heat exchange fins 38 are mounted on the funnel-shaped wall 36, as shown.

The front end of the heat exchange chamber 37 is closed by the reversing baffle 39 and the cover 40. The combustion air supplied through the socket 30 from the blower 29 is intimately mixed in the chamber surrounded by the lining 34 with the fuel sprayed by the atomiser 26, and this fuel-air mixture is ignited by a sparking plug mounted at a suitable point (not shown). The sparking plug need only be operated once when starting the appliance, since the fuel-air mixture subsequently supplied is self igniting. The hot combustion gases pass from the main combustion chamber formed within the cylindrical lining 34 through the funnel-shaped wall 36 into the heat exchange chamber 37, change direction at the reversing baffle 39 and flow back between the heat exchanger fins 38, so transferring a maximum amount of heat to the coolant flowing through the jacket 35. By the time the gases have arrived at the opposite side of the funnel-shaped wall 36, they have given out most of the heat contained therein, and escaped through the exhaust socket 41 to atmosphere. An aperture 42 provided below the atomiser 26 is in communication with a pipe line 43 and serves as a drain for the excess fuel accumulating in the lower portion of the appliance. The coolant is sucked in through the socket 19 by the coolant pump 20 and is fed through the pipe line 44 into the annular jacket space 35. A drain and safety valve 45 is provided in the pipe 44.

An electrical switch (not shown) may be provided to control the heating appliance, and also, if desired, the sparking plug or other igniting device.

We claim:
1. In an internal combustion engine for motor vehicles including a coolant chamber, a radiator, connections between said chamber and radiator for the circulation of a liquid coolant, a heating appliance, a first pipe means for passing a coolant liquid from the coolant chambers to the heating appliance, and second pipe means for returning the coolant from the heating appliance to the coolant chamber, the improvement which comprises an elongated cylindrical casing constituting a housing for said appliance, coaxial shaft means, a driving motor on said shaft, a burner centrally of said casing, fuel and air inlets to said burner, a combustion chamber adjacent to said burner, a heat exchange chamber at one end of said casing, a jacket surrounding said heat exchange chamber and carrying said coolant liquid, a blower mounted on the inner end of said shaft adjacent to said burner for feeding combustion air to said burner and forcing combustion gases through said heat exchange chamber within the jacket, a circulating pump on the outer end of said shaft, an inlet pipe for said coolant extending from said pump to said jacket, a coolant outlet from said jacket to a heater, said coolant inlet of the heating appliance being connected to said first pipe, said coolant outlet of the heating appliance being connected to said second pipe, a combustion gas outlet from said combustion chamber into said heat exchange chamber.

2. Apparatus according to claim 1 in which there is a fuel pump driven by said shaft for feeding fuel to said fuel inlet.

3. Apparatus according to claim 1 in which there is means for selectively connecting said heater in parallel with said coolant outlet, whereby optionally said coolant heated by said heating appliance or by said heating appliance and said engine may be passed through said heater.

4. Apparatus according to claim 3 in which the means for selective connection includes a switch element between said coolant outlet and said second pipe to selectively direct the heated coolant through said second pipe only or through said heater only or through both of said second pipe and heater simultaneously.

5. Apparatus according to claim 1 in which there is means at the end of said heat exchange chamber to reverse the direction of flow of said combustion gases.

6. Apparatus according to claim 5 in which a concentric cylinder within said combustion chamber provides an annular space between said jacket and cylinder, said combustion gases passing through said cylinder and reversely passing through said space, and heat exchange members in said space.

7. Apparatus according to claim 1 in which a transverse wall having a central opening is interposed between said combustion and heat exchange chambers.

References Cited in the file of this patent

UNITED STATES PATENTS

| Number | Name | Date |
|---|---|---|
| 1,683,101 | Rushmore | Sept. 4, 1928 |
| 2,308,888 | McCollum | Jan. 19, 1943 |
| 2,405,144 | Holthouse | Aug. 6, 1946 |
| 2,463,908 | Rose | Mar. 8, 1949 |

FOREIGN PATENTS

| 110,466 | Sweden | Dec. 20, 1941 |